United States Patent
Chen et al.

(10) Patent No.: US 9,268,667 B2
(45) Date of Patent: Feb. 23, 2016

(54) SYSTEM AND METHOD TO CREATE A NON-VOLATILE BOOTABLE RAM DISK

(71) Applicant: Dell Products, LP, Round Rock, TX (US)

(72) Inventors: Tao Chen, Shanghai (CN); Xiao Ping Fang, Ningbo (CN); Eng Hooi Teoh, Shanghai (CN); Li Feng Lin, Shanghai (CN); Hai Bo Yang, Shanghai (CN)

(73) Assignee: DELL PRODUCTS, LP, Round Rock, TX (US)

( * ) Notice: Subject to any disclaimer, the term of this patent is extended or adjusted under 35 U.S.C. 154(b) by 245 days.

(21) Appl. No.: 13/720,483

(22) Filed: Dec. 19, 2012

(65) Prior Publication Data

US 2014/0173171 A1    Jun. 19, 2014

(51) Int. Cl.
*G06F 3/06*     (2006.01)
*G06F 11/36*    (2006.01)
*G06F 9/44*     (2006.01)

(52) U.S. Cl.
CPC .......... *G06F 11/3664* (2013.01); *G06F 9/4406* (2013.01)

(58) Field of Classification Search
None
See application file for complete search history.

(56) References Cited

U.S. PATENT DOCUMENTS

| | | | |
|---|---|---|---|
| 5,694,583 A * | 12/1997 | Williams et al. | 703/24 |
| 7,222,229 B1 * | 5/2007 | Miyamoto et al. | 713/1 |
| 7,360,072 B1 * | 4/2008 | Soltis et al. | 713/2 |
| 7,895,472 B2 * | 2/2011 | Quach et al. | 714/27 |
| 8,560,822 B1 * | 10/2013 | Chan et al. | 713/1 |
| 2009/0307481 A1 * | 12/2009 | Wisecup et al. | 713/2 |
| 2014/0089573 A1 * | 3/2014 | Sakthikumar et al. | 711/105 |

OTHER PUBLICATIONS

Nikkei ("Forensic Analysis of GPT Disks and GUID Partition Tables", 2009).*

* cited by examiner

*Primary Examiner* — Aimee Li
*Assistant Examiner* — Tracy Chan
(74) *Attorney, Agent, or Firm* — Prol Intellectual Property Law, PLLC; H. Kenneth Prol (57) ABSTRACT

A manufacturing testing system includes an information handling system, a RAM memory device including a reserved physical RAM address space, non-volatile bootable disk, and a header for the reserved physical RAM address space. The head may include a non-volatile bootable disk signature, a start physical address, a length of reserved space, and a processor.

20 Claims, 4 Drawing Sheets

SYSTEM AND METHOD TO CREATE A NON-VOLATILE BOOTABLE RAM DISK

FIELD OF THE DISCLOSURE

The present disclosure generally relates to information handling systems, and more particularly to a system and methods for creating a non-volatile bootable RAM disk.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. Production of information handling systems and their variety of hardware and software resources may involve robust quality testing before delivery, including testing of the information handling system in a pre-boot execution environment (PXE).

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
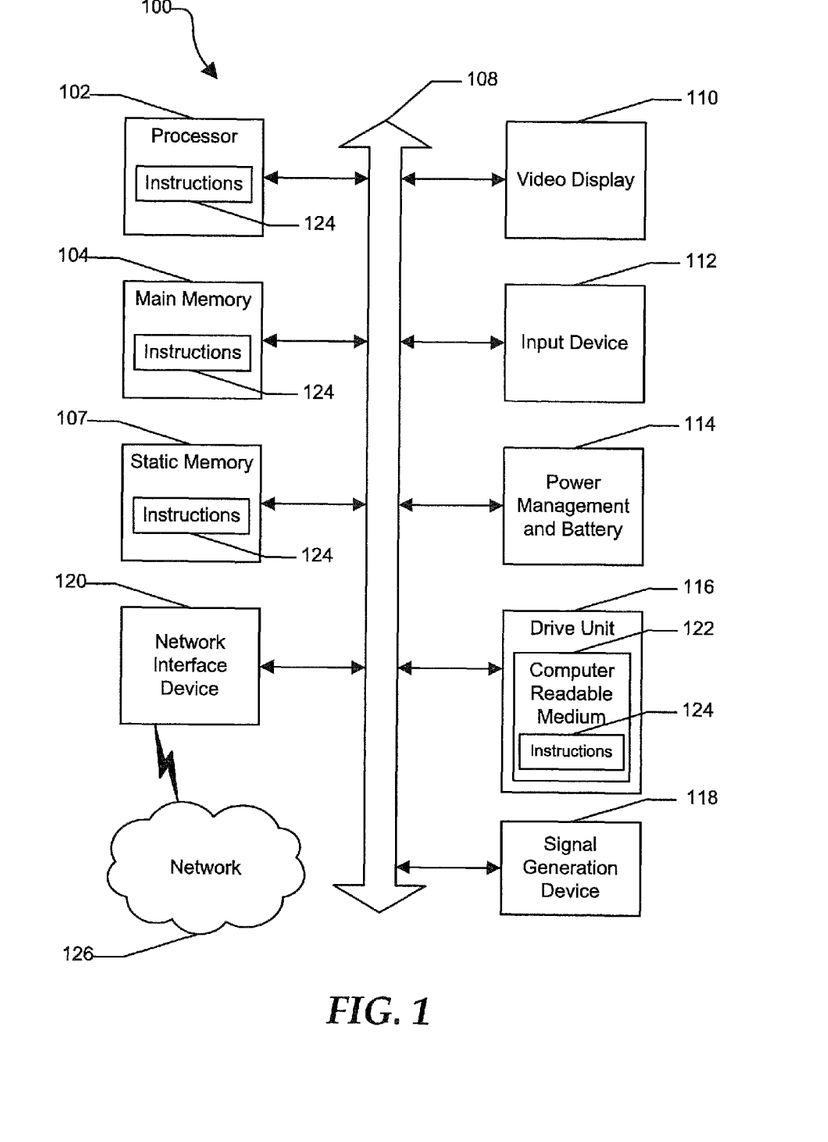
FIG. 1 is a block diagram of an information handling system, according to an embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a smartphone, a PDA, a mobile information handling system, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code (a set of instructions, sequential or otherwise, that specify actions to be taken by that machine). Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

The information handling system 100 can include a set of instructions that can be executed to cause the computer system to perform any one or more of the methods or computer based functions disclosed herein. The computer system 100 may operate as a standalone device or may be connected, such as via a network, to other computer systems or peripheral devices. In a networked deployment, the information handling system 100 may operate in the capacity of a server or as a client user computer in a server-client user network environment, or as a peer computer system in a peer-to-peer (or distributed) network environment.

In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 is a block diagram of one information handling system 100. FIG. 1 shows a system 100 capable of administering each of the specific embodiments of the present disclosure. The information handling system 100 may include a processor 102 such as a central processing unit (CPU), a graphics processing unit (GPU), or both. Moreover, the information handling system 100 can include a main memory 104, such as random access memory (RAM) and a static memory 107 such as a solid state drive (SSD). Main memory 104 and static memory 107 can communicate with each other via a memory and I/O bus 108. The information handling system 100 includes signal generation device 118 such as for a speaker or a remote control. The information handling system 100 can also include a disk drive unit 116, and a network interface device 120 such as a network interface card (NIC). As shown, the information handling system 100 may further include a video display unit 110, such as a liquid crystal display (LCD), an organic light emitting diode (OLED), a flat panel display, a solid state display, or a cathode ray tube (CRT). The video display unit 110 may also act as an input accepting touchscreen inputs. Additionally, the information handling system 100 may include an input device 112, such as a keyboard, or a cursor control device, such as a mouse or touch pad. Information handling system may include a battery system 114. The information handling system 100 can represent a device capable of telecommunications and can share resources, voice communications, and data communications among multiple devices.

The disk drive unit 116 or static memory 107 may include a computer-readable medium 122 in which one or more sets of instructions 124 such as software can be embedded. The disk drive unit 116 or static memory 107 also contains space for data storage. Further, the instructions 124 may embody one or more of the methods or logic as described herein. In a particular embodiment, the instructions 124 may reside completely, or at least partially, within the main memory 104, the static memory 107, and/or within the processor 102 during execution by the information handling system 100. The main memory 104 and the processor 102 also may include computer-readable media. The network interface device 120 can provide connectivity to a network 128, e.g., a wide area network (WAN), a local area network (LAN), wireless network (IEEE 802), or other network and remote data resources such as those associated with a remote data center (not shown). The network interface 120 may also interface with macrocellular networks including wireless telecommunications networks such as those characterized as 2G, 3G, or 4G or similar wireless telecommunications networks. The network interface 120 may be wired or be a wireless adapter having antenna systems for various wireless connectivity and radio frequency subsystems for signal reception, transmission, or related processing.

The present disclosure contemplates a computer-readable medium that includes instructions 124 or receives and executes instructions 124 responsive to a propagated signal; so that a device connected to a network 128 can communicate voice, video or data over the network 128. Further, the instructions 124 may be transmitted or received over the network 128 via the network interface device 120.

Information handling system 100 includes one or more application programs 124, and Basic Input/Output System and Firmware (BIOS/FW) code 124. BIOS/FW code 124 functions to initialize information handling system 100 on boot up or reboot, to launch an operating system, and to manage input and output interactions between the operating system and the other elements of information handling system 100. In a particular embodiment, BIOS/FW code 124 resides in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside on computer readable medium 122 in drive 116, in a ROM (not illustrated) associated with information handling system 100, in a ROM (not illustrated) associated with various devices of information handling system 100, in static storage system 107, in a storage system (not illustrated) associated with network channel 120, or in another storage medium of information handling system 100, or a combination thereof. Application programs 124 and BIOS/FW code 124 can each be implemented as single programs, or as separate programs carrying out the various features as described herein. The BIOS/FW code 124 may be instrumental in selecting the boot device by directing the processor to executable code stored on a boot device such as static memory 107 or disk drive 116 or a non-volatile bootable RAM disk established in the memory 104 as in the current disclosure. Non-volatile bootable RAM may survive rebooting an information handling system when the RAM is continuously powered, for example by standby power or a backup battery. Priority of the boot device may be set in the BIOS/FW determining the selected device for boot-up. The information handling system may also be set in manufacturing mode to permit testing. In manufacturing mode tokens may be set to trigger the BIOS/FW code 124 to set a special boot order that involves the boot device priority settings, and may access code or information to configure the non-volatile bootable RAM disk, header, and other testing requirements as described further herein.

Not all information handling systems 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
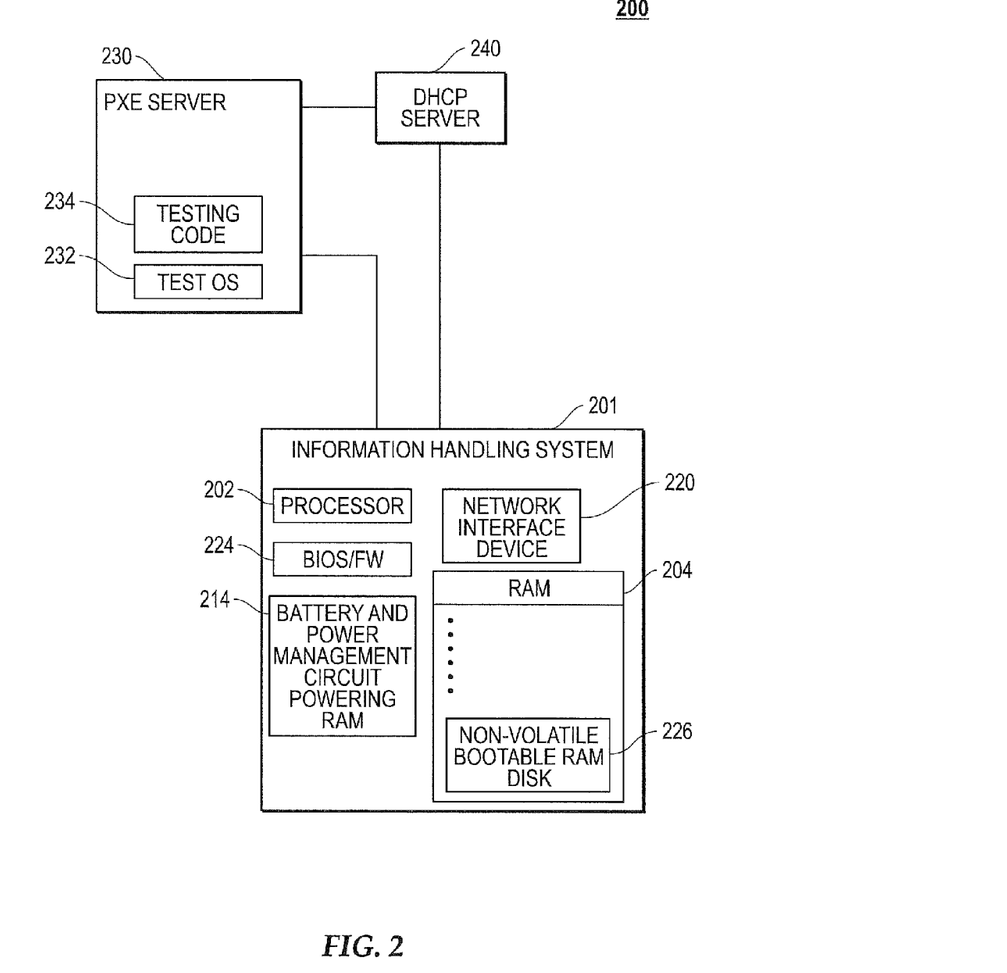
FIG. 2 is a block diagram of a manufacturing testing system for use in testing an information handling system, according to an embodiment of the present disclosure.

FIG. 2 illustrates a manufacturing testing system according to an embodiment of the present disclosure. The system includes an information handling system 201 to be tested, a pre-boot execution environment (PXE) server 230, and a dynamic host configuration protocol (DHCP) server 240. Information handling system 201, PXE server 230, and DHCP server 240 are interconnected in the present embodiment by an IP network that may be a wired or wireless connection. In the example embodiment, the DHCP manages and controls the data communications across these three network components and any other components used in the disclosed system. Other types of data communication protocols are also contemplated. Other components may include, in an example embodiment, a remote data center (not shown) that may contain instructions or data that are transferred to the information handling system 201 or may store data retrieved from the tested information handling system 201.

In an embodiment as depicted in FIG. 2, the tested information handling system contains a subset of components described above for FIG. 1, including processor 202, main memory (RAM) 204, power management circuit and battery system 214, network interface device 220, and BIOS/FW code 224. These components of the tested information handling system 201 may operate in accordance with descriptions above regarding FIG. 1 and as described elsewhere in this disclosure.

Main memory 204 is shown as a volatile random access memory (RAM) which also has substantial benefits of very speedy access times for the tested information handling system 201. A portion of RAM 204 has been reserved and established to operate as a non-volatile bootable RAM disk 226. During testing, the information handling system 201 may be set in manufacturing mode. The setting may be made in BIOS/FW 224. During manufacturing, testing of information handling system can require frequent rebooting, or even powering down and booting up again, to gather testing data for all components, systems, and software of the information handling system. Rebooting or powering down may reset the RAM memory 204 in normal circumstances. Then the information handling system must boot to a test operating system 232 via a network connection where the test operating system (OS) 232 and executable testing code 234 is hosted at PXE server 230 in some embodiments. Such a testing process may take a long time due to time due to boot or rebooting the information handling system 201 in such a manner. Similarly, booting from a hard disk drive 116 or solid state drive 107 may be substantially slower than accessing RAM 204. Furthermore, diskless test processes cannot be supported where there is no bootable non-volatile storage available to save a test OS 232, test software 234, and test data.

Accessing a non-volatile bootable RAM disk 226 in RAM 204 is a faster way to boot up a tested information handling system 201 during multiple reboots that may occur during manufacturing tests. However, RAM is volatile memory that may be reset on reboot or that loses data upon powering down. RAM disk can survive rebooting however when the RAM is powered by stand-by power or with a back-up battery power source. Thus, it may behave as non-volatile. In manufacturing mode, the information handling system 201 does not reset the reserved non-volatile bootable RAM disk 226 or maintains power to RAM 204 and does not reset a non-volatile bootable RAM disk 226 during testing. Rebooting does not disconnect power to RAM 204, so in one example embodiment of the present disclosure the system does not reset the non-volatile bootable RAM disk 226 of RAM 204 during reboot.

During power down, however, the information handling system 201 may need to maintain power to RAM 204 to preserve the non-volatile bootable RAM disk 226. The manufacturing mode setting in BIOS/FW maintains or switches to a power source connection from alternating current (A/C) power or battery power 214 to RAM 204 while powering down or restarting the information handling system. The information handling system 201 may reset the remainder of the information handling system as well as those parts of RAM 204 not reserved as a non-volatile bootable RAM disk 226. Power management circuit 214 may activate a power connection or switch to a special standby A/C circuit to power the RAM and preserve the non-volatile bootable RAM disk 226 during testing in manufacturing mode. Alternatively, the RAM may remain powered by the power management circuit 214 switching to battery power to continuously power the RAM 204 and non-volatile bootable RAM disk 226.

PXE server 230 is depicted as storing testing code 234 and test operating system 232. Upon establishing a non-volatile bootable RAM disk 226 during manufacturing mode testing, testing code 234 and test operating system 232 may be copied and transferred to non-volatile bootable RAM disk 226 for speedier access during testing. Storage of the testing code 234 and test operating system 232 in non-volatile bootable RAM disk 226 of RAM 204 is discussed further in connection with FIGS. 3A and 3B. In an embodiment the testing code 234 and test OS 232 may be run on a physical of the information handling system when a non-volatile bootable RAM disk is established as described below. Alternatively, code to establish a non-volatile bootable RAM disk before establishment may be in a virtual BIOS of a virtualized host platform running a virtualization application such as, VMWare®, Microsoft®, Xen®, on a hypervisor type information handling system at a remote data center. The PXE server may also couple with one or more centralized databases 240, such as lightweight directory access protocol (LDAP), internet storage name service (iSNS), dynamic host configuration protocol (DHCP) (shown) and/or a variety of other databases. A remote data center, such as an internet small computer system interface (iSCSI) storage array (not shown) may hold any number of boot images. As should be readily understood, the boot images are a set of instructions for starting-up the information handling system 201 for performing certain tasks. An Ethernet network or similar network may couple the information handling system 201, the PXE server, the centralized databases/server 240 and/or the remote data center together for communication. The architecture shown in FIG. 2 may work across a variety of host platforms such as, servers or clients, independent of the computing model used, (e.g., physical or virtual computing models).

Figure 3A:
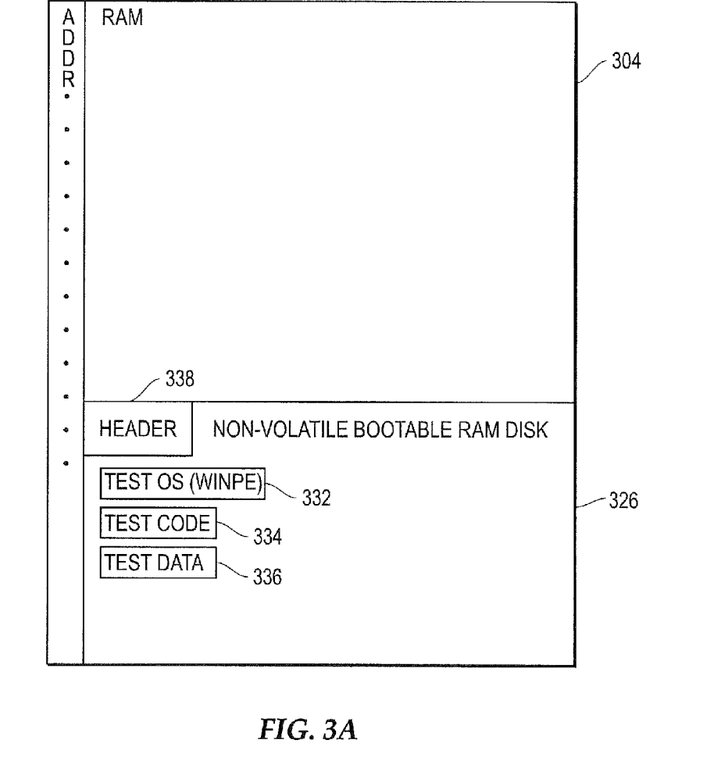
FIG. 3A illustrates a non-volatile bootable RAM disk architecture for use with an information handling system, according to an embodiment of the present disclosure.

FIG. 3A illustrates RAM memory 304 with a non-volatile bootable RAM disk 326 for use with an information handling system 100. The example embodiment of FIG. 3A depicts the non-volatile bootable RAM disk 326 at a high address reserved memory space. In addition, the reserved RAM 304 space is continuous. Reserving RAM 304 memory at any available physical memory address of RAM, whether continuous or not, is also contemplated in the present disclosure. In another embodiment, the non-volatile bootable RAM disk 326 includes a header 338 having basic descriptive information establishing the reserved RAM address space as non-volatile bootable RAM disk 326. The header 338 also contains bytes or bits of information to emulate a bootable disk and define and identify the reserved non-volatile bootable RAM disk memory space. In an embodiment, the non-volatile bootable RAM disk 326 may store a test operating system 332 (e.g., Window Pre-Installation Environment (WinPE)), executable test code 334 for conducting tests on the information handling system, and an interim test data log 336 for storing data resulting from testing done to the information handling system. In the example embodiment, the disclosed solution may have the test operating system 332 and executable test code 334 downloaded from the PXE server 230 or another remote data location to the non-volatile bootable RAM disk memory space in preparation for testing and to permit speedy access to test routines. Downloading may occur via a network interface device of the information handling system and test operating system 332 and executable test code 334.

Figure 3B:
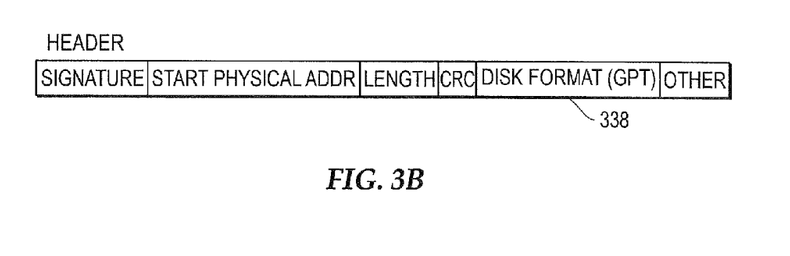
FIG. 3B illustrates an example embodiment of the non-volatile bootable RAM of FIG. 3A.

FIG. 3B illustrates an example embodiment of the non-volatile bootable RAM disk memory header 338. In the header, allocated bytes or bits may indicate several fields. The header 338 may include, for example, a non-volatile bootable RAM disk signature to identify the non-volatile bootable RAM disk space 326 to the BIOS/FW operating on the processor. The non-volatile bootable RAM disk space signature may identify what reserved portion of RAM 304 to preserve from being reset upon powering down or rebooting during testing. In another example embodiment, header 338 may include a field to indicate the start of the physical address space range or ranges that will be reserved as the non-volatile bootable RAM disk 326 in memory 304. Header 338 may also include an indication of the length of the reserved RAM address range for the non-volatile bootable RAM disk 326 in the example embodiment. An additional field embodiment in header 338 may be a cyclical redundancy check (CRC) field to verify the reliability of the data stored in the non-volatile bootable RAM disk 326 as is known in the art. Other fields may also be included in header 338 such as those indicating disk format type, fields to establish disk address formatting for the non-volatile bootable RAM disk 326 (e.g., sector formats such as GPT or MBR), and other header command or identification fields to enable the non-volatile bootable RAM disk 326 to emulate a bootable disk. Additional header entries may be available as required by the implementation of the systems and methods of the present disclosure.

Figure 4:
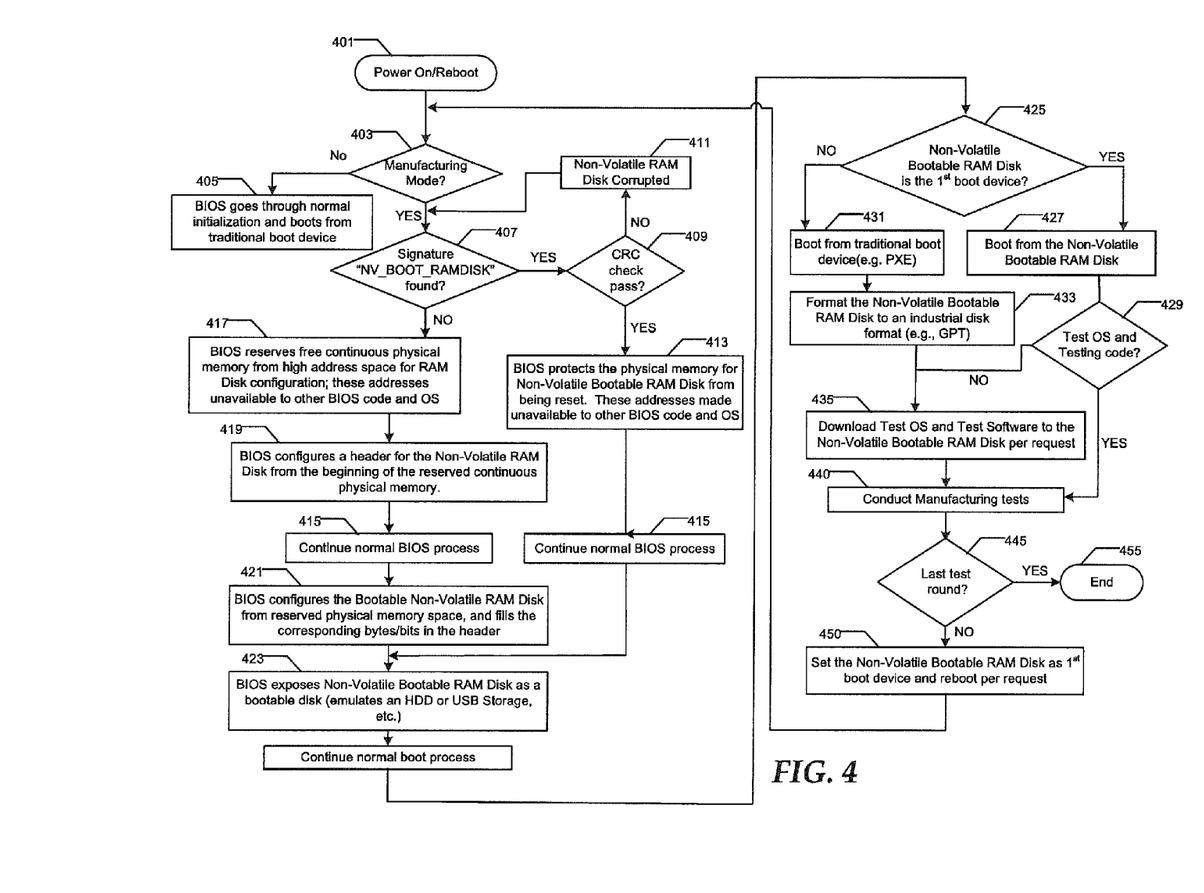
FIG. 4 is a flow chart of a method for creating a non-volatile bootable RAM disk for use with testing an information handling system, according to an embodiment of the present disclosure.

FIG. 4 depicts an embodiment of a method for creating a non-volatile bootable disk emulated in the RAM memory of an information handling system during testing. Some part of this embodiment may be also understood to depict using a non-volatile bootable RAM disk during testing the user information handling system, especially when the testing requires frequent rebooting or powering down of the information handling system. Additional embodiments involve logging and storing test data in the non-volatile bootable RAM disk and transferring that test data upon request to another networked location such as a pre-boot execution environment (PXE) server or other remote data center. The embodiment of FIG. 4 specifically shows the establishment of a non-volatile bootable RAM disk in system memory of the information handling system at a high address of continuous free memory space which is less likely to be used by the information handling system OS and other BIOS/FW functions. But such a high-address is not a requirement. Other embodiments may involve any range of RAM memory or multiple ranges of non-continuous free space in RAM with accessibility to the allotted range or ranges of RAM as an emulated bootable disk. In a non-continuous embodiment, some subset of header data may need to be associated with the component address ranges that would comprise a non-volatile bootable RAM disk. This data may be a sub-header for each non-continuous range of reserved RAM.

The non-volatile bootable RAM disk is sequestered from the remaining available RAM during operation of the BIOS/FW code and operating system, for example a test operating system. Exceptions to access include however, the information handling system setting up or removing of the non-volatile bootable RAM disk, use of the non-volatile bootable RAM disk for a boot image, operating from the non-volatile bootable RAM disk to execute test OS function, or conducting testing routines and gathering and storing data or other necessary functions as described herein. The protection of the reserved RAM address is meant to protect any portion of the non-volatile bootable RAM disk from being overwritten by other RAM access function. In the example embodiment, BIOS/FW settings make the reserved address range or ranges unavailable for the processor during manufacturing mode except as necessary for the non-volatile bootable RAM disk to emulate a bootable disk.

To make RAM memory non-volatile, the RAM memory may remain powered during reboot of the information handling system. Upon system reboot that occurs during testing, sometimes frequently, power is continuously provided to the RAM memory as described above with respect to FIG. 2. The while the RAM is reset as it would be during a normal reboot of an information handling system, the non-volatile bootable RAM disk is protected and preserved during testing.

In this embodiment at block 401, the user information handling system powers on to boot up or reboots. At decision diamond 403, the information handling system processor detects whether the manufacturing mode is turned on. In manufacturing mode, the information handling system may operate for testing and execute a specified boot sequence for testing. During manufacturing mode, the BIOS/FW may control rebooting the system while maintaining power to the system RAM, as described above. The information handling system may also be able to access pre-boot data and information, testing code, and a test operating system during manufacturing mode via a network interface card connection to a pre-boot execution environment (PXE) server. Test software, test operating system, boot image downloads, and other instructions and data relating to testing or boot up and operation are available via the PXE. Communication with the PXE may be monitored, authenticated, and maintained via a Dynamic Host Configuration Protocol (DHCP) server or other protocols for handling network data transfer.

If manufacturing mode is not on at decision diamond 403, then the flow proceeds to block 405 where the BIOS initializes the information handling system and boots from a traditional boot device, such as a non-volatile disk drive or a flash memory. If manufacturing mode is turned on at decision diamond 403, the system BIOS determines whether a non-volatile bootable RAM disk signature is found in RAM at 407. For example, the signature may be "NV_BOOT_RAM-DISK" as depicted in the example embodiment. Such a signature will be stored in a header to portion of RAM reserved for the non-volatile bootable RAM disk.

Proceeding to decision diamond 409 upon detecting a non-volatile bootable RAM disk signature at decision diamond 407, the system checks the cyclical redundancy check (CRC) of the non-volatile bootable RAM disk for data accuracy. The CRC field may also appear in the header portion of RAM reserved for the non-volatile bootable RAM disk. If the CRC check does not pass at decision diamond 409, flow proceeds to block 411 where the non-volatile bootable RAM disk is designated as corrupted. The system processor and BIOS may at that point clear the existing non-volatile bootable RAM disk and header from RAM. The flow may then feed back to decision diamond 407 to determine whether the non-volatile bootable RAM disk signature is found. Having been recently cleared, the non-volatile bootable RAM disk signature should then not be found at decision diamond 407. The flow will then proceed to block 417 which is described further below.

If the CRC check does pass at decision diamond 409, the flow proceeds to block 413 where the BIOS protects the physical RAM memory locations reserved for the non-volatile bootable RAM disk from being reset. The addresses reserved to the non-volatile bootable RAM disk are made unavailable to other BIOS operations and to the operating system booting up. Proceeding to 415, the information handling system continues normal BIOS processes of initialization and booting up. The flow proceeds to block 423 which is discussed further below.

If no non-volatile bootable RAM disk signature is found at decision diamond 407, the flow proceeds to block 417 where the flow begins a process to establish a non-volatile bootable RAM disk for emulation as a bootable disk. At block 417, the BIOS reserves free continuous physical memory for RAM disk configuration. In one embodiment, the reserved continuous physical memory is selected at a high address space. This is done since the high address space is less likely to be used for system memory functions or by the operating system. In an alternative embodiment, the reserved physical RAM space need not be continuous as describe further above. Upon reserving the physical memory for a non-volatile bootable RAM disk, the reserved addresses are made unavailable to the BIOS for other operations and unavailable to the operating system function while the non-volatile bootable RAM disk is established. Additionally, the reserved physical memory of the non-volatile bootable RAM disk is protected from being reset by the BIOS during any subsequent reboot in manufacturing mode.

Proceeding to 415, the information handling system continues normal BIOS processes of initialization and booting up. Next the flow proceeds to block 419 where the BIOS configures the header for the non-volatile RAM disk. In an embodiment, the header may be established at the beginning of the reserved continuous physical memory space. The header may contain the non-volatile bootable RAM disk signature, identification of the beginning physical address of the non-volatile bootable RAM disk, the length of the reserved physical space, a CRC field, and fields enabling disk emulation, the emulated disk formatting, and other possible header fields as discussed above with respect to FIG. 3B.

Proceeding with normal BIOS initialization and start up the flow proceeds to block 421. At block 421, the BIOS configures the non-volatile bootable RAM disk in the reserved physical memory space and fills the corresponding bytes and bits in the header with corresponding information. At block 423, the BIOS exposes the non-volatile bootable RAM disk as a bootable disk. The non-volatile bootable RAM disk emulates a hard disk drive, USB attached non-volatile storage medium, a solid state storage device, or similar bootable disk. The reserved portion of physical RAM memory is made available as a bootable device despite usually being unavailable as volatile memory.

The flow then proceeds with a normal boot process for the information handling system to decision diamond 425 where the processor determines if the non-volatile bootable RAM disk is designated in the BIOS as the first boot device for the boot-up process. If the non-volatile bootable RAM disk is the first boot device designated in the BIOS, the processor proceeds to block 427 where the system boots from the non-volatile bootable RAM disk. The flow will proceed to decision diamond 429 to determine if the test OS and executable testing code is already stored in the non-volatile bootable RAM disk. If not, the flow will proceed to block 435 to download this test OS and testing software. Block 435 is described in further detail below. If the test OS and executable testing code is stored in the non-volatile bootable RAM disk, the system proceeds to conduct manufacturing tests at block 440.

If the non-volatile bootable RAM disk is not the first boot device at decision diamond 425, the system boots from a traditional boot device at block 431. In a testing scenario during manufacturing mode, this may be designated as PXE server via a network interface (NIC). The PXE server may have a testing OS and executable testing code stored thereon or access to the same at a remote server. The communications with the PXE server may be managed via a DHCP protocol as described above in FIG. 2. Proceeding to block 433, the processor may format the non-volatile bootable RAM disk to an industrial disk format (e.g. GPT) found in a traditional boot device that the non-volatile bootable RAM disk aims to emulate. Example industrial disk formats may include the GUID Partition Table format (GPT), the Master Boot Record format, or similar such standard partitioned formats for non-volatile memory known in the art. The selected partitioned formatting may be indicated in the header for the non-volatile bootable RAM disk. The flow proceeds to block 435.

At block 435, the user information handling system downloads a test operating system (e.g., WinPE) and executable testing code for conducting manufacturing testing on the information handling system. The test OS and testing software is downloaded to the non-volatile bootable RAM disk per request. The test OS and testing software may be downloaded via a pre-boot execution environment (PXE) from a PXE server or other remote data location according to normal data communication protocols such as DHCP or other protocols known in the art.

Upon establishing the existence of a non-volatile bootable RAM disk and header and the test OS and testing software, the flow proceeds to block 440 where system conducts manufacturing testing according to the executable testing code downloaded to the non-volatile bootable RAM disk. The system may conduct testing pursuant to the executable testing code stored in the non-volatile bootable RAM disk. Data collected as a result of the testing may be logged and stored in the non-volatile bootable RAM disk on an interim basis. At any point of manufacturing testing via test OS and executable testing code stored the non-volatile bootable RAM disk, the system may transfer stored interim testing data via a network interface to a remote data location. This may be done at any time, for example at the end of each round of testing and before the next reboot for a new round of testing in one embodiment. In another embodiment, the transfer of interim testing data from the non-volatile bootable RAM disk to a remote data location may occur at the end of the final round of testing. In yet another embodiment, the transfer may occur at any other time it is requested by a master testing system running at a remote data location, such as a PXE server, and collecting and storing test data for information handling systems under test.

Upon completion of a round of manufacturing testing which is not the final round of testing, the flow proceeds to block 450 where the processor sets the non-volatile bootable RAM disk as the first boot device in the BIOS. The system then proceeds to reboot per request for a next round of testing. Alternatively, the system may request to shut down and restart. Upon reboot, the flow returns to 401 and the process may repeat as described above. If the last round of testing is completed, the flow proceeds to 455 where it ends.

If the final round of testing is complete and all image software has been correctly loaded and is functional on the information handling system, manufacturing mode may be turned off. Upon shutting down the system after testing is complete and manufacturing mode is off, the next power up or reboot of the system automatically clears the non-volatile bootable RAM disk and header. When not in manufacturing mode, constant power supply may not provided to the system RAM upon powering down. Alternatively if the system is not powered down but rebooted after manufacturing mode is turned off, the reboot may reset the entire RAM. The BIOS/FW is then set to have a traditional boot device as the first boot device of the information handling system when manufacturing mode is off. Upon power-up or reboot, the system will proceed through blocks 401, 403 and 405 of FIG. 4.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium"

includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A manufacturing testing system comprising:
a test information handling system;
a RAM memory device of the test information handling system including a reserved physical RAM address space to use as a non-volatile bootable disk;
a header for the reserved physical RAM address space including a non-volatile bootable disk signature, a start physical address, and a length of reserved space; and
a processor for conducting testing of the test information handling system using at least a portion of executable testing code and a portion of a test operating system stored in the reserved physical RAM address space of the test information handling system during testing reboot;
wherein the reserved physical RAM address space is formatted to resemble a bootable disk partitioned memory.

2. The system of claim 1, wherein the test information handling system is in a manufacturing mode.

3. The system of claim 1, further comprising:
test log data stored in the reserved physical RAM address space.

4. The system of claim 1, further comprising:
a network interface for sending test log data to a remote data center upon request.

5. The system of claim 1, wherein the reserved physical RAM address space is set as a first boot device in a basic input/output system setting.

6. The system of claim 1, wherein the portion of executable testing code and the portion of test operating system stored in the reserved physical RAM address space are downloaded from a remote data center via a pre-boot execution environment.

7. The system of claim 1, wherein the processor detects a non-volatile bootable disk signature in the header for the reserved physical RAM address space and protects the reserved physical RAM address space from reset during booting of the test information handling system by maintaining power to at least that portion of physical RAM during reboot.

8. A test information handling system comprising:
a processor and a basic input/output system;
a test operating system and executable testing code to run on the processor;
a RAM memory device of the test information handling system including a reserved continuous physical RAM address space formatted to resemble a partitioned memory of a non-volatile bootable disk; and
a header for the reserved continuous physical RAM address space including a non-volatile bootable disk signature, and a start physical address of the reserved continuous space;
wherein the processor and BIOS reboot the test information handling system while preserving data and instructions stored in the reserved continuous physical RAM address space during testing reboot of the test information handling system.

9. The test information handling system of claim 8, wherein the processor preserves data and instructions stored in the reserved continuous physical RAM address space upon detecting the non-volatile bootable disk signature by maintaining power to at least that portion of physical RAM during reboot.

10. The test information handling system of claim 8, wherein test log data is stored in the reserved continuous physical RAM address space.

11. The test information handling system of claim 8, wherein the reserved continuous physical RAM address space is formatted in a partitioned format.

12. The test information handling system of claim 10, further comprising:
a network interface for sending test log data to a remote data center upon request.

13. The test information handling system of claim 11, wherein the reserved continuous physical RAM address space and header are cleared upon completion of testing.

14. A method comprising:
determining that test information handling system having a RAM is in a manufacturing mode;
reserving physical RAM address space of the test information handling system for use as a non-volatile bootable disk;
configuring a header at the beginning of the reserved physical RAM space including a non-volatile bootable disk signature and a start physical address for the reserved physical RAM address space;
formatting the reserved physical RAM space to resemble a bootable disk partitioned memory; and
downloading a test operating system and test software to the reserved physical RAM space for preservation during testing reboot of the test information handling system.

15. The method of claim 14, further comprising:
setting the reserved physical RAM space as a first boot device; and
booting the test information handling system from the reserved physical RAM space.

16. The method of claim 14, further comprising:
storing test log data in the reserved physical RAM space.

17. The method of claim 14, further comprising:
sending test log data to a remote data server upon request.

18. The method of claim 14, further comprising:
clearing the header and the reserved physical RAM space upon first boot up when the manufacturing mode is turned off.

19. The method of claim 14, wherein the reserved physical RAM space is high-address continuous physical RAM space.

20. The method of claim 14, further comprising:
protecting the reserved physical RAM space from being reset upon reboot if the non-volatile bootable disk signature is detected in the header by maintaining power to at least that portion of RAM during reboot.

* * * * *